UNITED STATES PATENT OFFICE.

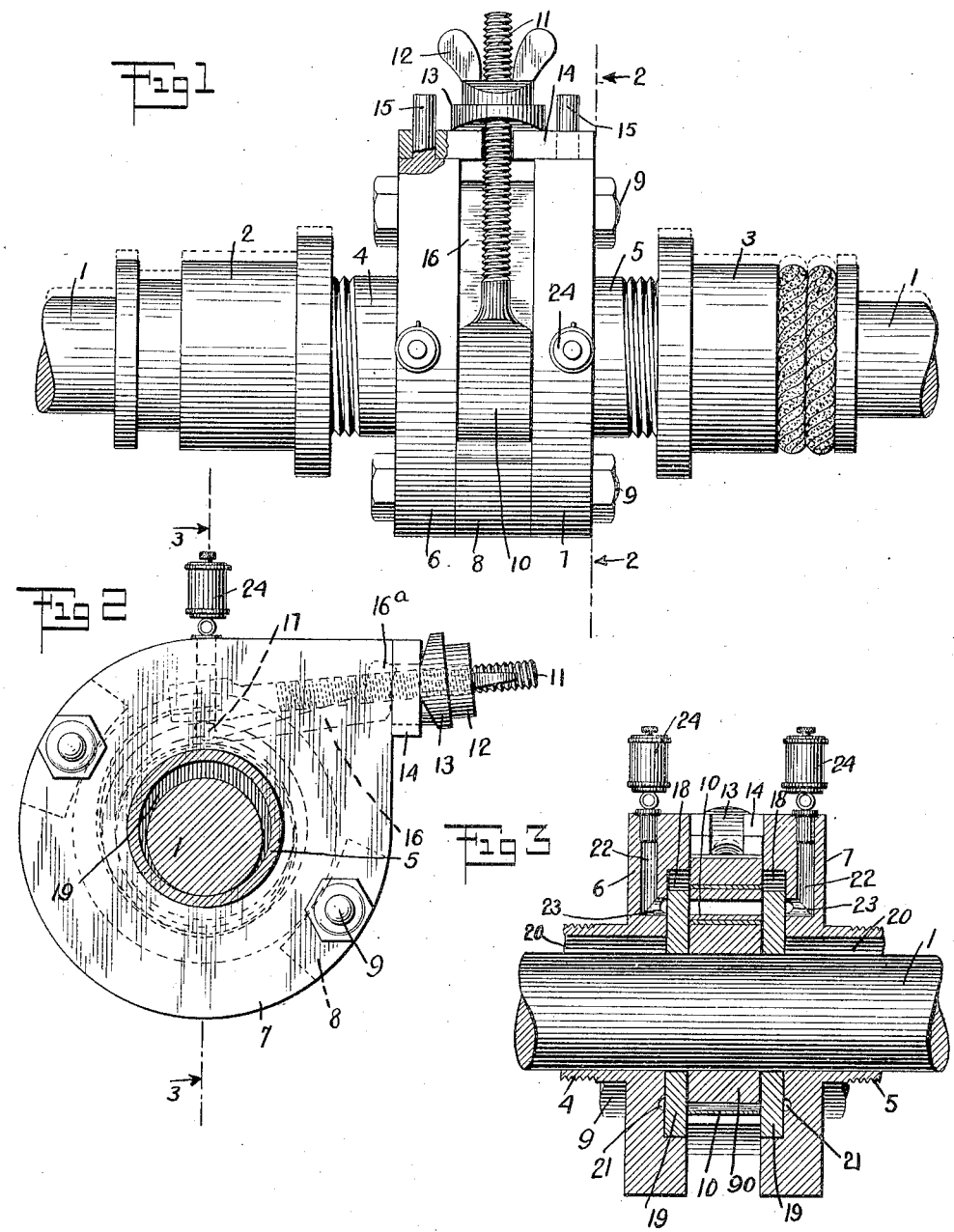

WILLIAM T. SNELL, OF BISBEE, ARIZONA.

PACKING-BOX.

1,057,363. Specification of Letters Patent. Patented Mar. 25, 1913.

Application filed November 5, 1912. Serial No. 729,570.

*To all whom it may concern:*

Be it known that I, WILLIAM T. SNELL, a citizen of the United States, and a resident of Bisbee, in the county of Cochise and State of Arizona, have invented a new and Improved Packing-Box, of which the following is a full, clear, and exact description.

This invention relates generally to an improved form of packing box of the kind described and claimed in Letters Patent No. 1,018,938, granted to me February 27, 1912.

The present invention is directed to an improved packing box characterized by an arrangement of parts whereby the packing will follow the piston rod or equivalent element when the said rod or element runs out of center.

The invention comprehends a structure which is termed a floating packing, which adjusts itself to the piston rod when the piston, because of wear or due to non-alinement of the cylinders, runs out of center.

The inventive idea is particularly adapted for use with the invention described and claimed in the Letters Patent above identified, and in the accompanying sheet of drawings I have illustrated the inventive idea applied to the structure disclosed in such patent.

Reference is to be had to the accompanying drawings forming a part of this specification, in which like characters of reference indicate corresponding parts in all the views, and in which—

Figure 1 is a top plan view of the packing box, partly sectional; Fig. 2 is a sectional view on the line 2—2 of Fig. 1; while Fig. 3 is a sectional view on the line 3—3 of Fig. 2.

The piston rod of the pump, or equivalent mechanism, is designated 1, while the glands are designated 2 and 3, which glands are adapted to be brought into engagement in stuffing boxes carried by the cylinder heads of the said pump or engine; the packing box proper comprises the cylindrical elements 4, 5 having the peripheral flanges 6—7 maintained in spaced relation by means of spacer blocks 8 and bolts and nuts 9. The length of the cylindrical elements 4—5 may, of course, be such that the packing box is adapted to different structures, and the size of the flanges 6—7 may also be widely varied, and the distance between them may be such that the box is adapted to different uses. The packing material is designated 90 and is positioned in close engagement with the piston rod 1, the packing material being maintained in such engagement by means of the strap 10, one end of which is connected to the threaded extension 11 carrying a wing nut 12 bearing against a second nut 13, which in turn engages a cross piece 14 movably mounted on the studs 15 which form part of the said flanges 6 and 7. Between the said flanges, and having one end in engagement with the said cross piece 14, is a wedge 16, the other end of which bears against a projection 17 on the said strap 10, whereby tightening the wing nut 12 on the threaded extension 11 will cause the strap 10 to bring the packing into close engagement with the said piston rod. This arrangement of parts is substantially described and claimed in the Letters Patent previously referred to, the particular invention comprehended in this application being directed to improvements which will now be described.

Referring particularly to Fig. 3, it will be noted that the inside of each of the flanges 6—7 is provided with a circular pocket 18 in which the substantially circular plates 19 are positioned, these said plates having openings therethrough presenting a substantial fit for the piston rod 1; the said packing 9 is between the flanges 6—7, and more particularly, is closely adjacent the said circular plates 19. It will be noted that the diameters of the pockets 18 are substantially greater than the diameters of the said plates 19, so that movement of the plates within the pockets is permitted within certain limits. Referring further to Fig. 3, openings 20 are shown within the said flanges 6—7, which openings are substantially equal to the inner diameter of the cylindrical elements 4—5, so that the piston rod 1 is permitted movement within certain limits inside of these cylindrical elements. The bottom wall of each of the pockets 18 in the said flanges 6 and 7 is provided with a recess 21 communicating with the upwardly extending passageways 22 in these said flanges by means of right-angularly extending passageways 23. Secured to the upper ends of the said flanges, and communicating with the said passageways and recesses, are oil cups 24, whereby lubrication may be provided for the engaging faces of the said pockets 18 and plates 19.

It will be seen that if the glands 2—3 are fixed in position in their respective stuffing boxes, the packing box as an entirety will be maintained substantially rigid in one position; if the piston rod is out of line so that the longitudinal axis thereof with respect to the packing material changes during reciprocation of the rod, free movement of the packing material within the box is permitted, the piston rod and packing material moving together to one side or the other of the said longitudinal axis; this movement is permitted by reason of the pockets 18 in the said flanges 6—7, the movement of the plates 19 in these pockets not interfering with the strap which brings about the pressure of the packing material, due to the fact that the ends of the said threaded member 11 and the said projection 17 on the strap, which engages the wedge 16, are closely adjacent, as shown particularly in Fig. 2, rocking movement being thereby permitted due to the particular construction of the second nut 13 on the threaded extension 11, and due to the further fact that the outer end 16ª of the said wedge 16 is substantially in pivotal engagement with the said cross piece 14. The provision of the recesses 21 and the passageways 22—23 provide for the application of a suitable lubrication to the plates 19, whereby efficiency is promoted; the provision of the glands 2—3, with their coöperating stuffing boxes, prevents leakage directly from the cylinders; and the cylindrical elements 4—5 provide, as it were, a housing for the piston rod in its movements, the interior diameter of such housing being such that the piston rod may reciprocate in different positions within certain limits due to wear or the parts being out of alinement.

Of course, the sizes of the different parts and the dimensions of the features of such parts are largely a matter of design in adapting the structure to machines of different sizes and uses, it being apparent that changes in such matters may be availed of without departing from the inventive idea.

Having thus described my invention, what I claim as new and desire to secure by Letters Patent is:—

1. A packing box comprising spaced elements provided with pockets on their adjacent sides, packing material between the elements adapted to surround a piston rod or equivalent element, and means engaging the packing and extending into the said pockets, whereby the packing may follow the piston rod when the same is moving.

2. A packing box of the floating type, comprising spaced elements, packing between the elements adapted to engage a piston rod or equivalent member, and plates adjacent the packing and in engagement with the said spaced elements and movable relatively thereto, whereby the packing may follow the piston rod when the same is moving out of center.

3. In a structure of the class described, the combination of packing adapted to be placed on a piston rod or equivalent member, plates surrounding the piston rod adjacent the packing, spaced elements concentrically arranged with respect to the piston rod, the said plates and packing being movable relatively to the said spaced elements, whereby the packing is permitted to follow the moving piston.

4. A structure of the class described, comprising packing adapted to be extended around a piston rod or equivalent member, plates adjacent the packing, spaced elements adjacent the plates, and means for bringing the packing into close engagement with the piston rod, the said means being movable, whereby the packing may follow the piston rod when the same is moving out of center.

5. The combination of packing adapted to be positioned on a piston rod or equivalent member, plates adjacent the packing and at opposite sides, spaced elements adjacent the plates, movably mounted means adjustable in nature and engaging the packing, whereby the same may be brought into close engagement with the piston rod, the said plates and the packing being movable relatively to the said spaced elements when the piston rod is working out of center, the said means for engaging the packing being also movable relatively to the said spaced elements.

6. The combination of a piston rod or equivalent member, packing surrounding the rod, plates adjacent opposite sides of the packing, spaced elements adjacent the plates, the elements being provided with pockets in which the plates are contained, whereby when the said elements are fixed in position and the piston rod is moving, the said plates and packing may move relatively to the said spaced elements in the event that the piston rod runs out of center.

7. The combination of a piston rod or equivalent member, packing surrounding the rod, plates adjacent the packing, spaced elements having pockets on adjacent sides, the said plates being positioned within the pockets, means for bringing the packing into close engagement with the piston rod, the said elements provided with the pockets being fixed in position, whereby the packing at the said plates with the means engaging the packing may follow the piston rod in its movement in the event that said piston rod runs out of center.

8. The combination of packing adapted to be positioned on a piston rod or equivalent member, plates adjacent opposite sides of the packing and provided with openings through which the piston rod passes, and spaced elements adjacent the plates provided with openings substantially greater than the diameter of the said piston rod, whereby movement of the rod, packing and plates is permitted relatively to the other spaced elements.

In testimony whereof I have signed my name to this specification in the presence of two subscribing witnesses.

WILLIAM T. SNELL.

Witnesses:
A. M. SMOCK,
W. G. HILLES.

Copies of this patent may be obtained for five cents each, by addressing the "Commissioner of Patents, Washington, D. C."